United States Patent
Wen et al.

(10) Patent No.: US 9,739,295 B2
(45) Date of Patent: Aug. 22, 2017

(54) FLUIDIC LOGIC GATES AND APPARATUS FOR CONTROLLING FLOW OF ER FLUID IN A CHANNEL

(75) Inventors: Weijia Wen, Kowloon (HK); Limu Wang, Kowloon (HK); Mengying Zhang, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 1035 days.

(21) Appl. No.: 13/635,259

(22) PCT Filed: Mar. 29, 2010

(86) PCT No.: PCT/CN2010/000390
§ 371 (c)(1),
(2), (4) Date: Sep. 14, 2012

(87) PCT Pub. No.: WO2011/113181
PCT Pub. Date: Sep. 22, 2011

(65) Prior Publication Data
US 2013/0008794 A1   Jan. 10, 2013

(51) Int. Cl.
*B81B 1/00* (2006.01)
*F15C 1/00* (2006.01)
(Continued)

(52) U.S. Cl.
CPC ........ *F15C 1/003* (2013.01); *B01L 3/502738* (2013.01); *B01L 3/502784* (2013.01);
(Continued)

(58) Field of Classification Search
CPC ......... B01L 13/0265; B01L 13/502784; B01L 2400/0415; B01L 2200/0673; B01D 21/01; G01N 1/2035
(Continued)

(56) References Cited

U.S. PATENT DOCUMENTS 6,245,426 B1   6/2001   Kornfeldt et al.
6,645,403 B1   11/2003  Park et al.
(Continued)

FOREIGN PATENT DOCUMENTS

CN          1675969 A       9/2005
DE    102007018801 A1      10/2008
WO       2011115959 A1      9/2011

OTHER PUBLICATIONS

Niu, et al., "Real-time detection, control, and sorting of microfluidic droplets", American Institute of Physics (2007), 12 pages.
(Continued)

*Primary Examiner* — Gurpreet Kaur
(74) *Attorney, Agent, or Firm* — Amin, Turocy & Watson, LLP

(57) ABSTRACT

An apparatus for controlling flow of ER fluid. The apparatus has a first channel 10 for conveying carrier fluid 1 of a first dielectric constant and droplets 2 of a second dielectric constant in the carrier fluid. The apparatus further comprises a second channel 20 conveying the ER fluid and a first conductor 100 for conveying an electrical potential from the second channel to the first channel. A circuit 61 is provided for applying potential difference between the first and second channels. When a droplet is present in the first channel, the ER fluid is solidified in the second channel; when no droplet is present, the ER fluid flows as liquid in the second channel. Therefore the apparatus acts as an IF gate. Arrangements for other types of fluidic logic gate are also disclosed.

20 Claims, 9 Drawing Sheets

(51) Int. Cl.
*B01L 3/00* (2006.01)
*F16K 99/00* (2006.01)

(52) U.S. Cl.
CPC ...... *F16K 99/0042* (2013.01); *F16K 99/0055* (2013.01); *B01L 2300/0816* (2013.01); *B01L 2400/0415* (2013.01); *B01L 2400/0677* (2013.01); *F16K 2099/0084* (2013.01)

(58) Field of Classification Search
USPC .......................................... 137/1; 251/129.01
See application file for complete search history.

(56) References Cited

U.S. PATENT DOCUMENTS

| | | |
|---|---|---|
| 6,852,251 B2 | 2/2005 | Sheng et al. |
| 2004/0219732 A1 | 11/2004 | Burns et al. |
| 2008/0185057 A1 | 8/2008 | Prakash et al. |
| 2011/0114190 A1 | 5/2011 | Wen et al. |
| 2011/0186164 A1* | 8/2011 | Glick ........................ 137/803 |

OTHER PUBLICATIONS

Dittrich, "Polymer droplet temperature sensor", The Royal Society of Chemistry (2009), 2 pages.
Zhang, et al., "Manipulations of microfluidic droplets using electrorheological carrier fluid", The American Physical Society (2008), 5 pages.
Niu, et al., "Generation and manipulation of 'smart' Droplets", The Royal Society of Chemistry (2008).
Niu, et al., "Electrorheological-fluid-based microvalves", American Institute of Physics, Applied Physics Letters 87, 243501 (2005).
Wen, Abstract of "Electrical Digitalization and Manipulation of Microfluidic Droplets"—Program & Abstracts—The 9th Asian-Pacific International Symposium on Microscale Separations and Analysis (APCE 2009) & The 1st Asian-Pacific International Symposium on Lab-on-Chip (APLOC 2009), 3 pages.
Wen, Conference Presentation of "Electrical Digitalization and Manipulation of Microfluidic Droplets"—The 9th Asian-Pacific International Symposium on Microscale Separations and Analysis (APCE 2009) & The 1st Asian-Pacific International Symposium on Lab-on-Chip (APLOC 2009).
International Search Report for Patent Application No. PCT/CN2010/000390 dated Dec. 23, 2010, 2 pages.
International Search Report and Written Opinion for International Application No. PCT/US11/28467 dated May 17, 2011, 26 pages.
Liu, et al., "Electrorheological fluid-actuated microfluidic pump". Applied Physics Letters, 89 (2006), 3 pages. http://repository.ust.hk/dspace/bitstream/1783.1/2891/1/Electrorheological.pdf.
Wang, et al., "Logic control of microfluidics with smart colloid", The Royal Society of Chemistry 2010—Lap Chip, 2010, 10, 2869-2874 (Sep. 30, 2011). http://pubs.rsc.org/en/content/articlelanding/2010/lc/c0lc00003e.

* cited by examiner

| FALSE | | | | |
|---|---|---|---|---|
| A | 0 | 0 | 1 | 1 |
| B | 0 | 1 | 0 | 1 |
| ΔV | 0 | 0 | 0 | 0 |
| Output | 0 | 0 | 0 | 0 |
| Definition | 0 | 0 | 0 | 0 |

| TRUE | | | | |
|---|---|---|---|---|
| A | 0 | 0 | 1 | 1 |
| B | 0 | 1 | 0 | 1 |
| ΔV | 2 | 3 | 3 | 6 |
| Output | 1 | 1 | 1 | 1 |
| Definition | 1 | 1 | 1 | 1 |

| IF A | | | | |
|---|---|---|---|---|
| A | 0 | 0 | 1 | 1 |
| B | 0 | 1 | 0 | 1 |
| ΔV | 0 | 0 | 2 | 2 |
| Output | 0 | 0 | 1 | 1 |
| Definition | 0 | 0 | 1 | 1 |

| IF B | | | | |
|---|---|---|---|---|
| A | 0 | 0 | 1 | 1 |
| B | 0 | 1 | 0 | 1 |
| ΔV | 0 | 2 | 0 | 2 |
| Output | 0 | 1 | 0 | 1 |
| Definition | 0 | 1 | 0 | 1 |

| NOT A | | | | |
|---|---|---|---|---|
| A | 0 | 0 | 1 | 1 |
| B | 0 | 1 | 0 | 1 |
| ΔV | 2 | 3 | 0 | 0 |
| Output | 1 | 1 | 0 | 0 |
| Definition | 1 | 1 | 0 | 0 |

| NOT B | | | | |
|---|---|---|---|---|
| A | 0 | 0 | 1 | 1 |
| B | 0 | 1 | 0 | 1 |
| ΔV | 2 | 0 | 3 | 0 |
| Output | 1 | 0 | 1 | 0 |
| Definition | 1 | 0 | 1 | 0 |

| A AND B | | | | |
|---|---|---|---|---|
| A | 0 | 0 | 1 | 1 |
| B | 0 | 1 | 0 | 1 |
| ΔV | 0 | 0.5 | 0.5 | 2 |
| Output | 0 | 0 | 0 | 1 |
| Definition | 0 | 0 | 0 | 1 |

| A NAND B | | | | |
|---|---|---|---|---|
| A | 0 | 0 | 1 | 1 |
| B | 0 | 1 | 0 | 1 |
| ΔV | 8/3 | 2 | 2 | 0 |
| Output | 1 | 1 | 1 | 0 |
| Definition | 1 | 1 | 1 | 0 |

| A OR B | | | | |
|---|---|---|---|---|
| A | 0 | 0 | 1 | 1 |
| B | 0 | 1 | 0 | 1 |
| ΔV | 0 | 2 | 2 | 8 |
| Output | 0 | 1 | 1 | 1 |
| Definition | 0 | 1 | 1 | 1 |

| A XOR B | | | | |
|---|---|---|---|---|
| A | 0 | 0 | 1 | 1 |
| B | 0 | 1 | 0 | 1 |
| ΔV | 0 | 2 | 2 | 0 |
| Output | 0 | 1 | 1 | 0 |
| Definition | 0 | 1 | 1 | 0 |

| A NOR B | | | | |
|---|---|---|---|---|
| A | 0 | 0 | 1 | 1 |
| B | 0 | 1 | 0 | 1 |
| ΔV | 2 | 1.5 | 1.5 | 0 |
| Output | 1 | 0 | 0 | 0 |
| Definition | 1 | 0 | 0 | 0 |

| A XNOR B | | | | |
|---|---|---|---|---|
| A | 0 | 0 | 1 | 1 |
| B | 0 | 1 | 0 | 1 |
| ΔV | 2 | 0 | 0 | 6 |
| Output | 1 | 0 | 0 | 1 |
| Definition | 1 | 0 | 0 | 1 |

| A =\=> B | | | | |
|---|---|---|---|---|
| A | 0 | 0 | 1 | 1 |
| B | 0 | 1 | 0 | 1 |
| ΔV | 2/3 | 1 | 2 | 0 |
| Output | 0 | 0 | 1 | 0 |
| Definition | 0 | 0 | 1 | 0 |

| A <=\= B | | | | |
|---|---|---|---|---|
| A | 0 | 0 | 1 | 1 |
| B | 0 | 1 | 0 | 1 |
| ΔV | 2/3 | 2 | 1 | 0 |
| Output | 0 | 1 | 0 | 0 |
| Definition | 0 | 1 | 0 | 0 |

| A => B | | | | |
|---|---|---|---|---|
| A | 0 | 0 | 1 | 1 |
| B | 0 | 1 | 0 | 1 |
| ΔV | 8/3 | 2 | 0 | 2 |
| Output | 1 | 1 | 0 | 1 |
| Definition | 1 | 1 | 0 | 1 |

| A <= B | | | | |
|---|---|---|---|---|
| A | 0 | 0 | 1 | 1 |
| B | 0 | 1 | 0 | 1 |
| ΔV | 8/3 | 0 | 2 | 2 |
| Output | 1 | 0 | 1 | 1 |
| Definition | 1 | 0 | 1 | 1 |

FLUIDIC LOGIC GATES AND APPARATUS FOR CONTROLLING FLOW OF ER FLUID IN A CHANNEL

CROSS-REFERENCE TO RELATED APPLICATIONS

This application is a U.S. National Stage of PCT Patent Application No. PCT/CN2010/000390, filed Mar. 29, 2010 and entitled "FLUIDIC LOGIC GATES AND APPARATUS FOR CONTROLLING FLOW OF ER FLUID IN A CHANNEL"; which claims priority to Hong Kong Patent Application No. 10102660.3, filed Mar. 15, 2010 and entitled "FLUIDIC LOGIC GATES AND APPARATUS FOR CONTROLLING FLOW OF ER FLUID IN A CHANNEL". The entireties of the above-referenced applications are incorporated herein by reference.

The present invention relates to apparatus for controlling the flow of fluid in channels, preferably microfluidic channels. In particular controlling the flow of ER fluid in a second channel based on presence or absence of droplets in a first channel.

BACKGROUND TO THE INVENTION

Microfluidic chips are chips having a plurality of channels. Typically the channels have a width of less than 1 mm. They are useful as 'labs on a chip" and may be used, for example, for enzymatic analysis, DNA analysis, proteomics etc. Indeed operations such as sample preparation, pretreatment and assay detection may be integrated onto a single chip. Chemical reactions at the small scale of the microfluidic chip tend to occur rapidly and use minimal amounts of material, thus saving time and money.

Droplet-based microfluidics has been attracting more and more interest because of its ability to perform a large number of different experiments without increasing the device size or complexity. In the form of droplets, reagents are conveyed precisely in discrete volumes, e.g. ranging from nano to pico liter size, so that high throughput chemical reaction and single cell manipulation in bio-testing can be achieved. Furthermore, by using microfluidics, mixing of reagents in droplets has been proved to be achievable in millisecond(s), thus enabling multi-step chemical reactions.

Various flow focusing, pump driven and other arrangements have been used to drive fluids and control operations on the microfluidic chip. Any pumps and valves tend to be driven by external electrical signals generated by external electronic circuitry. Digital microfluidics is the control of droplets by use of digital signals (i.e. 1 or 0).

Electrorheological (ER) fluid has been widely studied on the macroscale as a type of 'smart' material. An ER fluid is a fluid which transforms to solid form on application of a sufficiently strong electrical field. More recently, a new type of ER fluid was developed with giant electrorheological (GER) effect—see for example U.S. Pat. No. 6,852,251, which is incorporated herein by reference. It consists of urea-coated nanoparticles suspended in sunflower oil. Under a sufficiently strong electric field, GER fluid can transform into an anisotropic solid, with a yield stress characterizing its strength. These rheological variations can occur within 10 milliseconds and are reversible when the field is removed. The GER fluid can work as a digital fluid if a coded electrical control signal is provided to control the fluid.

SUMMARY OF THE INVENTION

The present invention proposes using the fluidics themselves to carry out the necessary logical operations to control the flow of fluids in the channels.

One aspect of the present invention is a method of controlling the flow of ER fluid in a second channel on the basis of the presence or absence of droplets in a first channel. In a preferred example, a first channel conveys a carrier fluid having a first dielectric constant or conductivity and droplets of a second fluid having a second dielectric constant or conductivity in said carrier fluid. The presence or absence of a droplet in the first channel, especially between a pair of electrodes of the first channel, provides digital information; e.g. a 1 corresponds to a droplet being present and a 0 corresponds to a droplet not being present at that moment in time.

Structures providing the logical equivalent of IF, OR, AND and NOT gates may be provided. Further, another aspect of the present invention provides a structure which acts as a universal logic gate, which may be configured to have the logical operation of any desired logic gate (e.g. 16 possible operations/configurations).

Apparatus according to a first aspect of the present invention may have a first channel for conveying a carrier fluid having a first dielectric constant or conductivity and droplets of a second fluid having a second dielectric constant or conductivity in said carrier fluid, a first conductor for conveying an electrical potential from the second channel to the first channel; and a circuit for applying a potential difference across the first and second channels. In this way the potential drop across the first channel, when a droplet is present, is different from the potential drop when no droplet is present. For example, if the droplet of second fluid has a higher dielectric constant or conductivity than the carrier fluid, then the potential drop across the first channel will be less when a droplet is present. The remaining potential drop is across the second channel. Thus when a droplet is present the majority of the potential drop is across the second channel and this is sufficient to stop the flow of ER fluid in the second channel. The arrangement thus acts as an IF gate and flow of the ER fluid in the second channel is stopped if a droplet is present in the first channel.

In a preferred embodiment the first channel has a first electrode pair comprising first and second opposing electrodes. Preferably the second channel has a second electrode pair comprising third and fourth opposing electrodes. The potential difference is applied between the first and fourth electrodes. The first conductor electrically connects the second and third electrodes so that they are at the same electrical potential. The arrangement thus acts as an IF gate.

The first conductor, third and fourth electrodes may be provided as an integral piece; e.g. a conducting member with one side adjacent the first channel and one side adjacent the second channel.

A circuit may be arranged to apply an electric potential difference between the first and the fourth electrodes. The apparatus may have a module for generating the control droplets and/or carrier fluid. The apparatus preferably also comprises a voltage source for applying a voltage to said first electrode.

The apparatus preferably further comprises a source of ER fluid; a source of carrier fluid and a source of droplets of a second fluid; the second fluid having a different dielectric constant or conductivity to the carrier fluid. The sources may, for example be pumps or containers containing the fluid.

The apparatus preferably further comprises a third channel for conveying carrier fluid of a third dielectric constant or conductivity and droplets of a fourth dielectric constant or conductivity in said carrier fluid; and a second conductor for conveying an electrical potential from the third channel to the second channel.

Preferably the first channel has first and second opposing electrodes, the second channel has third and fourth opposing electrodes and said third channel has fifth and sixth opposing electrodes. The circuit may be arranged to apply an electric potential difference between the first and the sixth electrodes. The first conductor preferably electrically connects the second and third electrodes and said second conductor electrically may connect said fourth and fifth electrodes. The potential difference between the first and sixth electrodes may be set such that ER fluid is stopped in the second channel when a droplet is between the first and second electrodes in the first channel and at the same time a droplet is between the fifth and sixth electrodes in the third channel. The arrangement thus acts as an AND gate.

In another arrangement the second channel has seventh and eighth opposing electrodes downstream of the third and fourth electrodes said circuit is arranged to apply an electric potential difference between the first and the fourth electrodes and a second circuit is arranged to apply an electrical potential difference between the seventh and sixth electrodes and wherein the second conductor electrically connects the eighth and fifth electrodes. The potential differences between the first and fourth electrodes and the seventh and sixth electrodes may be set such that ER fluid is stopped in the second channel when a droplet is between the first and second electrodes in the first channel or when a droplet is between the fifth and sixth electrodes in the third channel. The arrangement thus acts as an OR gate.

A second aspect of the present invention provides a method of controlling the flow of ER fluid, comprising providing first and second channels; allowing a carrier fluid having a first dielectric constant or conductivity and droplets of a second fluid having a second dielectric constant or conductivity to flow in the first channel; allowing ER fluid to flow in the second channel; and applying a potential difference across the two channels so that the flow of ER fluid is controlled based on the properties and/or location of droplets of the second fluid in the first channel.

Preferably the first channel has first and second opposing electrodes and the flow of ER fluid in the second channel is stopped when a droplet of the second fluid is between the first and second electrodes of the first channel. This is an IF gate type operation.

The method may use an apparatus in which the first channel has a first electrode pair comprising first and second opposing electrodes and the second channel has a second electrode pair comprising third and fourth opposing electrodes and a first conductor connects the second and third electrodes. The potential difference is then applied across the first and fourth electrodes so that the flow of ER fluid in the second channel is stopped when a droplet of the second fluid is in the first channel between the first and second electrodes.

The method may require providing an apparatus in which the first channel has first and second opposing electrodes, the second channel has third and fourth opposing electrodes, said third channel has fifth and sixth opposing electrodes, the first conductor electrically connects the second and third electrodes and the second conductor electrically connects said fourth and fifth electrodes. The method may include setting a potential difference between the first and sixth electrodes such that ER fluid is stopped in the second channel when a droplet is between the first and second electrodes in the first channel and at the same time a droplet is between the fifth and sixth electrodes in the third channel. This is an AND gate operation.

The method may include providing an apparatus as described above, but in which the second channel has seventh and eighth opposing electrodes downstream of the third and fourth electrodes and the second conductor electrically connects the eighth and fifth electrodes instead. The method may comprise applying a potential difference between the first and the fourth electrodes and a potential difference between the seventh and sixth electrodes such that the flow of ER fluid in the second channel is stopped when a droplet is between the first and second electrodes in the first channel or when a droplet is between the fifth and sixth electrodes in the third channel. This is an OR gate operation.

Another aspect of the invention provides a method of controlling the flow of ER fluid in a second channel on the basis of the locations (and/or properties) of droplets in a first channel and/or a third channel. The method may use any of the apparatus listed in the above or below aspects of the invention.

In the various aspects of the present invention, the flow of the ER fluid in a second channel is controlled by droplets in a first channel and/or a third channel. The flow state of the ER fluid may be used to actuate or control pumps or valves in yet another channel. Flow of the fluid (e.g. a non ER fluid) in the another channel may thus be controlled indirectly by the droplets. This has potential for parallel computation and large scale integration.

A third aspect of the present invention provides an apparatus for controlling flow of ER fluid comprising:—
a first channel for conveying carrier fluid of a first dielectric constant or conductivity and droplets of a second dielectric constant or conductivity in said carrier fluid;
a second channel for conveying ER fluid;
wherein the first channel has a first and second opposing electrodes and the second channel has third and fourth opposing electrodes;
a first conductor electrically connects the second electrode with the third electrode;
a first voltage input $V_1$ is coupled to the first electrode and a second voltage input $V_2$ is coupled to the third electrode via a first capacitor.

The second voltage input $V_2$ may be coupled to the third electrode either directly or indirectly (e.g. via the second electrode or the first conductor).

Preferably the first and second voltage inputs are set such that, in use, the ER fluid is stopped in the second channel when no droplet is present between the first and second electrodes of the first channel. The arrangement then acts as a NOT gate.

There may be a third voltage input $V_3$ coupled to the fourth electrode of the second channel.

The apparatus may comprise a module for generating said droplets and/or a voltage source for applying a voltage to said first voltage input. There may also be a voltage source for applying a voltage to said second voltage input.

The apparatus may comprise a source of ER fluid; a source of carrier fluid and a source of droplets of a second fluid; the second fluid having a different dielectric constant or conductivity to the carrier fluid.

Preferably the second fluid, referred to in the above and below aspects of the invention, is a dielectric fluid. For example it may be an ER fluid. Alternatively it may comprise water, be an ionized fluid or a conductive fluid.

The first capacitor may be a conventional capacitor (e.g. a capacitor having a solid dielectric, such as a ceramic capacitor), or may be a channel for conveying fluid and having a pair of opposing electrodes. A first one of said opposing electrodes is connected to said second voltage input and a second one of said opposing electrodes is connected to said third electrode (e.g. via the first conductor.)

A fourth aspect of the invention provides an apparatus for controlling flow of ER fluid comprising:— a first channel for conveying carrier fluid of a first dielectric constant or conductivity and droplets of a second dielectric constant or conductivity in said carrier fluid;

a second channel for conveying ER fluid;

wherein the first channel has a first and second opposing electrodes and the second channel has third and fourth opposing electrodes;

a first conductor electrically connects the second electrode with the third electrode;

a first voltage input $V_1$ connected to the first electrode and a second voltage input $V_2$ coupled (directly or indirectly) to the third electrode via a third channel; said third channel having a fifth electrode connected to said second voltage input $V_2$ and a sixth electrode connected to the third electrode; said third channel being arranged for conveying a dielectric fluid. The sixth electrode may be connected directly to the third electrode, or indirectly to the third electrode e.g. via the first conductor or the second electrode. The fifth and sixth electrodes face each other across opposites sides of the channel.

The fourth aspect of the invention may have any of the features of the first to third aspects noted above.

A fifth aspect of the present invention provides an apparatus for controlling flow of ER fluid comprising:— a first channel for conveying carrier fluid of a first dielectric constant or conductivity and droplets of a second dielectric constant or conductivity in said carrier fluid; said first channel having first and second opposing electrodes;

a second channel for conveying ER fluid and having third and fourth opposing electrodes;

a third channel for conveying carrier fluid of a third dielectric constant or conductivity and droplets of a fourth dielectric constant or conductivity in said carrier fluid; said third channel having fifth and sixth opposing electrodes;

a first conductor for electrically connecting the second and third electrodes;

a second conductor electrically connecting the fourth and fifth electrodes; and four inputs to which a voltage may be applied; the first input being connected to the first electrode; the second input being connected to the third electrode via a first capacitor; the third input being connected to the fourth electrode via a second capacitor and the fourth input being connected to the sixth electrode.

The first conductor, second and third electrodes may be provided integrally or as separate elements. The second conductor, fourth and fifth electrodes may be provided integrally or as separate elements.

The second input may be coupled to the third electrode either directly or indirectly (e.g. via the second electrode or the first conductor). Likewise, the third input may be connected to the fourth electrode either directly or indirectly (e.g. via the fifth electrode or the second conductor).

The flow of ER fluid in the second channel is controlled by the presence or absence of droplets between the electrode pairs of the first and/or third channels (the control channels). The control is in accordance with a desired logical operation. The type of logical operation is determined by the voltages applied to the first to fourth voltage inputs. Thus by choosing the voltages applied to the first to fourth voltage inputs any of one of 16 different logical operations can be chosen.

The apparatus may have a module for adjusting the voltages applied to the first, second, third and fourth inputs so as to give the desired logical characteristics to the apparatus.

The first and second capacitors may be conventional capacitors (e.g. capacitors having a solid dielectric, such as ceramic capacitors) or may be channels for conveying fluid. The first capacitor may be a fourth channel having seventh and eighth opposing electrodes. The eighth electrode is connected to the second voltage input and the seventh electrode is connected to the third electrode (either directly or indirectly, e.g. via the first second electrode or the first conductor). The second capacitor may be a fifth channel having ninth and tenth opposing electrodes; the ninth electrode being connected to the fourth electrode (either directly, or indirectly) and the tenth electrode being connected to the third voltage input.

The apparatus may have a downstream pair of opposing electrodes in the second channel downstream of the third and fourth electrodes, said downstream pair of opposing electrodes being arranged for detecting flow of ER fluid downstream of the third and fourth electrodes and/or conveying or generating an electrical signal based on said detection.

The first capacitor is preferably connected to the third electrode via a conducting line external to the apparatus. Likewise the second capacitor is preferably connected to the fourth electrode by a conducting line external to the apparatus.

The apparatus of the above aspects may have a source of ER fluid and a module for generating flow of ER fluid to the second channel. The apparatus may have sources of carrier fluid and droplets and modules for generating flow of carrier fluid and droplets to the first channel and the third channel. The modules may, for example, have a flow focusing or T-junction structure. Preferably ER fluid is in the capacitor channels. Preferably the capacitor channels have the same width as the second channel.

A sixth aspect of the invention provides an apparatus for controlling flow of ER fluid comprising:— a first channel for conveying carrier fluid of a first dielectric constant or conductivity and droplets of a second dielectric constant or conductivity in said carrier fluid; said first channel having first and second opposing electrodes;

a second channel for conveying ER fluid and having third and fourth opposing electrodes;

a third channel for conveying carrier fluid of a third dielectric constant or conductivity and droplets of a fourth dielectric constant or conductivity in said carrier fluid; said third channel having fourth and fifth opposing electrodes;

a first conductor for electrically connecting the second and third electrodes;

a second conductor electrically connecting the fourth and fifth electrodes; and four inputs to which a voltage may be applied; the first input being connected to the first electrode; the second input being connected to the third electrode via a fourth channel for conveying dielectric fluid; the third input being connected to the fourth electrode via a fifth channel for conveying dielectric fluid and the fourth input being connected to the sixth electrode.

The sixth aspect may have any of the features of the fifth aspect mentioned above.

The fourth channel preferably has seventh and eight opposing electrodes and the fifth channel preferably has ninth and tenth electrodes. The seventh electrode may be connected to the third electrode and the eighth electrode may be connected to the second voltage input. The ninth electrode may be connected to the fourth electrode and the tenth electrode may be connected to the third voltage input.

A seventh aspect of the present invention provides a method of controlling the flow of ER fluid, comprising providing an apparatus according to the third or fourth aspect of the present invention; allowing a carrier fluid having a first dielectric constant or conductivity and droplets of a second fluid having a second dielectric constant or conductivity to flow in the first channel; allowing ER fluid to flow in the second channel; and applying voltages to the first and second voltage inputs such that flow of ER fluid is stopped in the second channel when no droplet is present between the first and second electrodes of the first channel. This is a NOT operation.

An eighth aspect of the present invention provides a method of controlling the flow of ER fluid comprising providing apparatus according to the fifth or sixth aspect of the present invention and setting and/or adjusting the voltages applied to the first, second, third and fourth inputs so as to cause the apparatus to have the desired logical characteristics. Many different logic operations may be performed by this apparatus and therefore it may be referred to as a universal logic gate.

The voltages may be set so that the apparatus performs a logical operation selected from the following group: FALSE, A AND B, A≠>B, A, A<≠B, B, A XOR B, A OR B, A NOR B, A XNOR B, NOT B, A<=B, NOT A, A=>B, A NAND B, TRUE. Any one of the selected operations may be performed by the apparatus.

The ER fluid used by the method and apparatus may be a GER fluid or a conventional ER fluid.

DESCRIPTION OF THE DRAWINGS

Preferred embodiments of the present invention will now be described, by way of example only, with reference to the accompanying figures in which:—

FIG. 1 (b) is a schematic diagram of an alternative arrangement of a microfluidic IF gate

DESCRIPTION

The apparatus is preferably provided on a microfluidic chip. The chip and channel walls may be fabricated from PDMS or any other suitable material. Where electrodes are referred to in the following description they are preferably provided adjacent the channel walls, or embedded into the channel walls. The channels are preferably less than 500 μm in width and diameter.

Figure 1A:
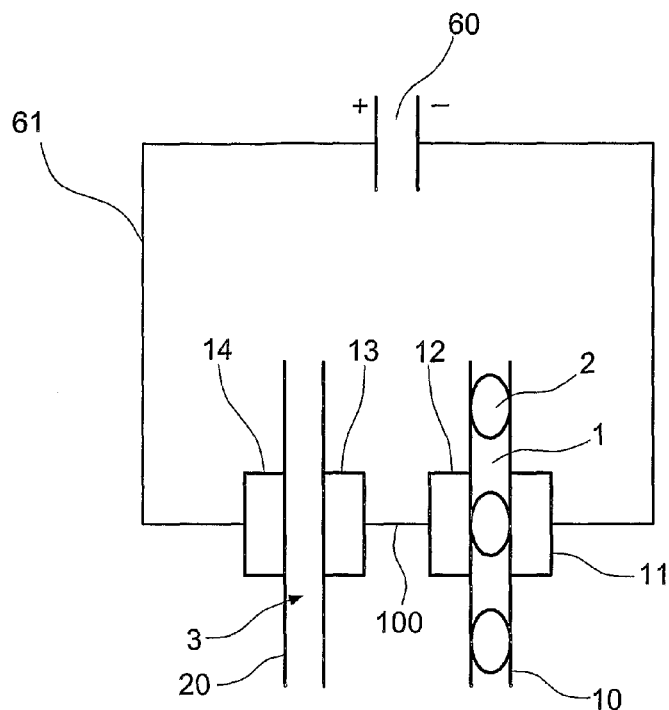
FIG. 1 (a) is a schematic diagram of an apparatus for controlling flow of ER fluid in a channel configured to act as a microfluidic IF gate.
Figure 1B:
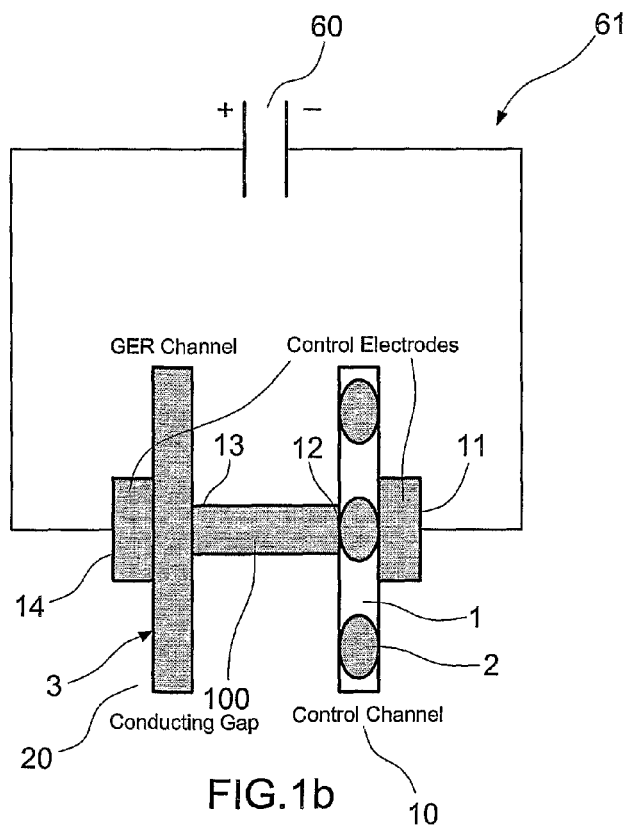

FIG. 1 (a) shows a microfluidic arrangement for controlling the flow of ER fluid in a channel. The arrangement is configured to act as an IF gate.

A first channel 10 acts as a control channel and conveys a carrier fluid 1 having a first dielectric constant or conductivity and droplets of a second fluid 2 in the carrier fluid. The droplets act as 'control droplets' and have a second dielectric constant or conductivity. Preferably the second dielectric constant or conductivity is higher than the first dielectric constant or conductivity.

The second channel 20 conveys ER fluid 3. The ER fluid may be a GER fluid. A first conductor 100 extends between the channels. It acts to convey an electric potential from the second channel to the first channel or vice versa.

The first channel 10 has a first electrode 11 on a first side thereof and an opposing second electrode 12 on the opposite side of the channel facing the first electrode 11. The second channel has a third electrode 13 on a first side thereof and an opposing fourth electrode 14 on the opposite side of the second channel, facing the third electrode 13. The first conductor 100 connects the second electrode 12 and third electrode 13 putting them in electrical contact. The first conductor 100 can either be integrated into the microfluidic chip (e.g. as a line of AgPDMS) or a conducting line external to the micro fluidic chip (e.g. an electrical wire outside of the chip connecting the two electrodes inside the chip). Generally, the second electrode 12 and third electrode 13 are at the same electrical potential as they are in conductive contact with each other. Although it would be possible for the conductor 100 to have a degree of resistance, so that there is a potential drop between the second and third electrodes, it is preferred that the resistance of the conductor 100 is very small or negligible.

In an alternative embodiment shown in FIG. 1 (b), the first conductor 100, second electrode 12 and third electrode 13 are provided as one integral piece. The first conductor 100 has a first end 12 adjacent a side of the first channel 10 and opposite the first electrode. This first end 12 acts as a second electrode opposing the first electrode 11. The first conductor 100 has a second end 13 adjacent a side of the second channel 20. The second end 13 acts as a third electrode which is opposite a fourth electrode 14 located on the other side of the second channel. The second electrode 12 and third electrode 13 are at the same electrical potential because they are integral parts of the first conductor 100.

A circuit 61 with a voltage source 60 applies an electrical potential difference between the first electrode 11 and fourth electrode 14. The conductor 100 electrically links the channels without letting fluid flow from one channel to the other. The conductor may be any suitable material; in a preferred embodiment the conductor comprises AgPDMS. The electrodes may also comprises AgPDMS.

The potential difference thus has a path through the first and second channels 10, 20 and the first conductor 100. The resistance of the first conductor 100 is preferably negligible. Therefore, if V is the potential difference provided by the voltage source 61, $V_1$ is the potential drop across the first channel and $V_2$ is the potential drop across the second channel, then $V=V_1+V_2$. That is $V_1$ is the control channel voltage and $V_2$ is the ER channel voltage.

The dielectric constant or conductivity of the droplets 2 is higher than the dielectric constant or conductivity of the carrier fluid 1. Therefore the potential drop across the first channel varies depending on whether or not a droplet 2 is between the first 11 and second 12 electrodes of the first channel. When a droplet 2 is between the first and second electrodes, then the potential drop $V_1$ in the first channel 10 is low and there is a relatively large potential drop $V_2$ across the second channel 20. The voltage $V_2$ across the second channel 20 is thus greater than the threshold required to convert the ER fluid to its solid phase and stop the flow of fluid in the second channel 20. However, when carrier fluid (i.e. no droplet) is between the first 11 and second 12 electrodes, the potential drop $V_1$ across the first channel 10 is relatively high. The potential drop $V_2$ across the second channel 20 is then lower and not enough to stop the flow of ER fluid in the second channel 20.

The arrangement thus acts as an IF gate. The first channel acts as a "control channel" and the second channel as the "output channel". Although the flow of fluid in the second (ER) channel is turned off when a droplet (logically equivalent to 1) is in the control channel, we consider the arrangement to be an IF gate rather than a NOT gate. The reason is that we consider the ER state to be "off" when it is fluid and to be "on" when it is activated to the solid state.

The following table summarizes the state of the apparatus in the situation where there is no droplet between the first and second electrodes of the first channel and where there is a droplet between the first and second electrodes of the first channel.

TABLE 1

| First Channel | $V_1$ | $V_2$ | ER Rheology | ER State | Flow in Second Channel | Output Signal from Second Channel |
|---|---|---|---|---|---|---|
| Droplet | Low | High | Anisotropic Solid | "On" | Off | No Droplet |
| No Droplet | High | Low | Liquid | "Off" | On | Droplet |

The "output signal" column simply indicates that a downstream part of the second channel may be arranged to generate droplets when the ER fluid is flowing.

It can be shown that:—

$$V_2 = V \in_C / (\in_C + \in_{ER})$$

Where V is the voltage from the voltage source across the two channels; $V_2$ is the voltage across the second channel, $\in_C$ is the dielectric constant of the carrier fluid and $\in_{ER}$ is the dielectric constant of the ER fluid. If a droplet is present between the first and second electrodes of the first channel then $\in_C$ should be replaced with $\in_D$ the dielectric constant of the droplet. $V_2$ is therefore variable depending on the presence or absence of a droplet in the first channel between the first and second electrodes. Thus $V_2$ may be expressed as a function of x, $V_2 = V_2(x)$, where x=1 if a droplet is present and 0 if a droplet is not present between the first and second electrodes. By way of example, if the ER fluid has a dielectric constant $\in_{ER} = 60$, the droplet has a dielectric constant $\in_D$ of 80 and the carrier fluid has a dielectric constant $\in_C$ of 2, then $V_2(0) = 1/32\ V$ (no droplet present); and $V_2(1) = 4/7\ V$ (droplet present)

The applied voltage V is tuned or selected such that $V_2(1)$ is above the threshold voltage required to solidify the ER fluid in the second channel and $V_2(0)$ is below the threshold required to solidify the ER fluid in the second channel. The threshold voltage depends upon the width of the second channel and the composition of ER fluid, as will be understood by a person skilled in the art.

Preferably the carrier fluid is an oil (e.g. silicon oil) and the droplets of the second fluid are a dielectric fluid, such as ER fluid. The second fluid (whose droplets are in the first control channel) may be the same as the ER fluid in the second channel. Alternatively, the second fluid may comprise water or may be an ionized solution or a conductive fluid.

If very high voltages are used or if the droplets of the second fluid in the control channel (first channel) are essentially conductive (e.g. a highly ionized solution) then the capacitance model in the above equations is not followed. Rather, in that case, it is appropriate to refer to the conductivity of the ER fluid and conductivity of the droplets, rather than the dielectric constants. However, it has been found that in these cases the potential drop across the first and second channels is still as described above and shown in Table 1.

Figure 2:
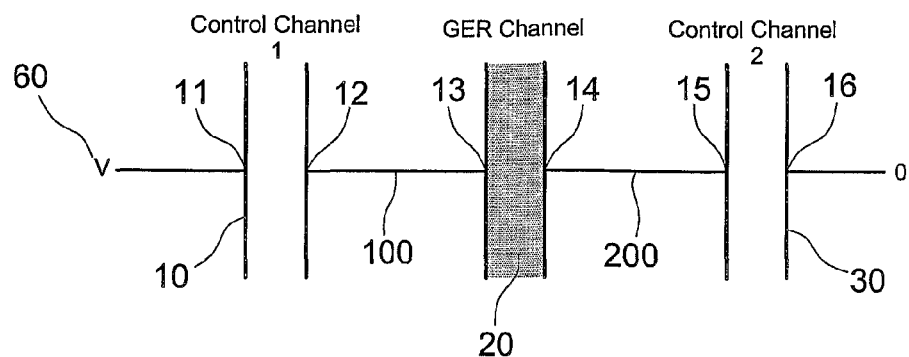
FIG. 2 is a schematic diagram of a microfluidic AND gate.

FIG. 2 shows a schematic arrangement for an AND gate. It has first and second channels 10, 20 connected by a first conductor 100, and first, second, third and fourth electrodes 11, 12, 13, 14 as in the arrangement of FIGS. 1a and 1b. In addition there is a third channel 30 which is a control channel similar to the first channel 10. The third channel 30 is arranged for conveying carrier fluid having a third dielectric constant or conductivity and droplets having a fourth dielectric constant or conductivity in the carrier fluid. The carrier fluid and droplets may have the same composition as those in the first channel, so the third dielectric constant or conductivity may be the same as the first dielectric constant or conductivity, and the fourth dielectric constant or conductivity may be the same as the second dielectric constant or conductivity. The third channel 30 has a fifth electrode 15 on a first side thereof and an opposing sixth electrode 16 on the second side thereof. A second conductor 200 conductively links the fourth electrode 14 of the second channel with the fifth electrode 15 of the third channel. The second conductor 200, fourth 14 and fifth 15 electrodes may be provided as one integral piece or as separate pieces.

The first and/or conductors 100, 200 can either be integrated into the microfluidic chip (e.g. as a line of AgPDMS) or may be conducting lines external to the micro fluidic chip (e.g. electrical wires outside of the chip connecting electrodes inside the chip).

A circuit having a voltage source 60, applies a potential difference V across the first 11 and sixth 16 electrodes. The first and sixth electrodes are electrically linked via the first, second and third channels and the first and second conductors. The voltage V is thus split across the first, second and third channels and the proportion to each channel depends upon whether there are droplets presenting in the first and third channels.

The voltage V is set such that the voltage drop across the second channel is sufficient to stop the flow of ER fluid in the second channel if a droplet is present in the first channel between the first and second electrodes and at the same time a droplet is present in the third channel between the fifth and sixth electrodes. In this case the voltage drop across the first and third channels is low and the voltage drop across the second channel is high (above the threshold to stop ER fluid). However if no droplet is present in either first or third channels, or in only one of the first and third channels, then the voltage drop across the second channel is insufficient to stop the flow of ER fluid in the second channel. Thus the arrangement forms an AND gate.

Figure 3:
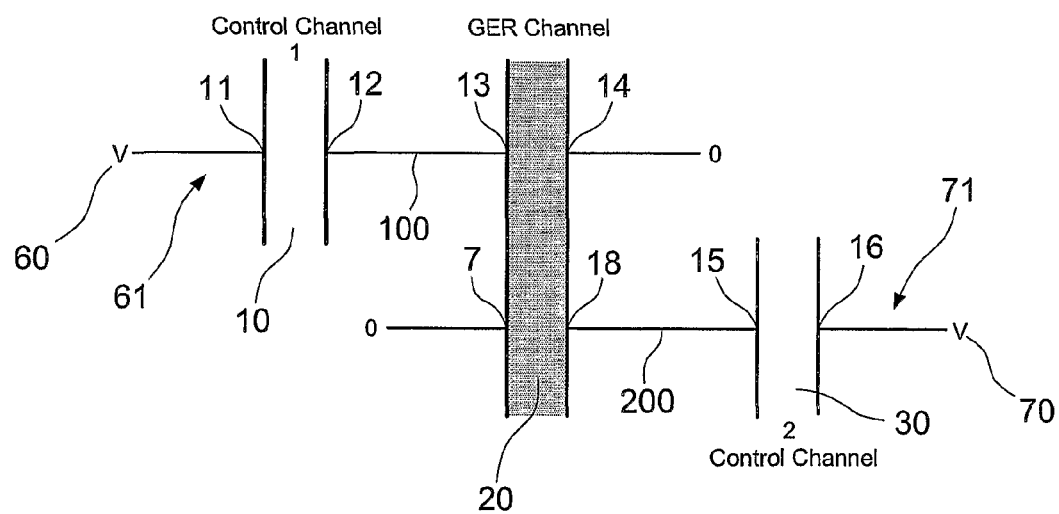
FIG. 3 is a schematic diagram of a microfluidic OR gate.

FIG. 3 shows an arrangement for an OR gate. There are first and second channels 10, 20 connected by a first conductor 100, and first, second, third and fourth electrodes 11, 12, 13, 14 as in the arrangement of FIGS. 1a and 1b. In addition there is a third channel 30 which acts as a control channel and is arranged for conveying carrier fluid having a third dielectric constant and droplets having a fourth dielectric constant in the carrier fluid. Preferably the carrier fluid and droplets have the same composition as those in the first channel. The third channel 30 has a fifth electrode 15 on a first side thereof and an opposing sixth electrode 16 on the second side thereof. The second channel has a seventh electrode 17 and opposing eighth electrode 18 at a location downstream of the third and fourth electrodes.

A second conductor 200 conductively links the eighth electrode 18 of the second channel with the fifth electrode 15 of the third channel 30. The second conductor 200, eight electrode 18 and fifth electrode 15 may be provided as separate pieces or one integral piece. A first circuit 60 applies a potential difference from a voltage source 60 across the first 11 and fourth 14 electrodes as in FIG. 1. A second circuit 71 applies a potential difference from a voltage source 70 across the sixth 16 and seventh 17 electrodes.

Where they are separate to the electrodes, the first and/or second conductors 100, 200 can either be integrated into the microfluidic chip (e.g. as a line of AgPDMS) or may be conducting lines external to the micro fluidic chip (e.g. electrical wires outside of the chip connecting electrodes inside the chip).

The circuits are arranged so that ER fluid is stopped in the second channel 20 if a droplet is between the first and second electrodes of the first channel 10 or if a droplet is between the fifth and sixth electrodes of the third channel 30. Specifically the voltage applied by the first circuit is set or tuned so that when a droplet is present between the first and second electrodes of the first channel, the potential drop across the second channel (between the third and fourth electrodes) is sufficient to stop the flow of ER fluid in the second channel (i.e. it is at or above the threshold for solidifying the ER fluid). Similarly the voltage applied by the second circuit 70 is set or tuned so that when a droplet is present between the fifth and sixth electrodes 15, 16 of the third channel 30, the potential drop across the second channel (between the seventh and eight electrodes) is sufficient to stop the flow of ER fluid in the second channel (i.e. it is at or above the threshold for solidifying the ER fluid). Likewise, if droplets are present both between the first and second electrodes and between the fifth and sixth electrodes, then flow of ER fluid in the second channel is stopped. Thus the arrangement acts as an OR gate.

Figure 4:
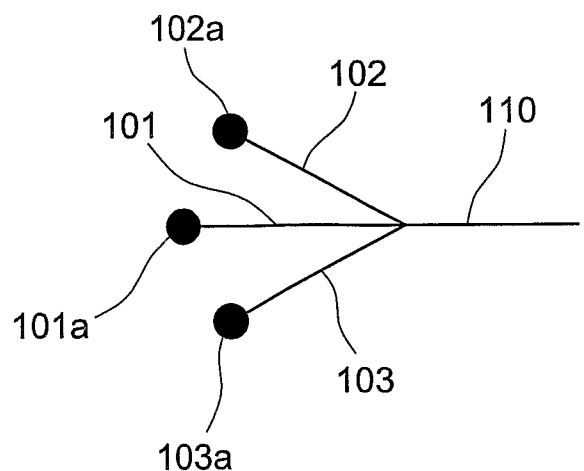
FIG. 4 is a schematic diagram of a module for generating droplets of a control fluid in a carrier fluid.
Figure 5:
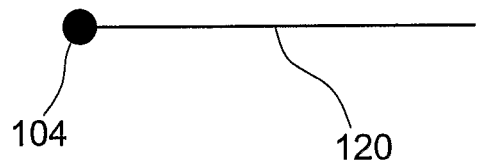
FIG. 5 is a schematic diagram of a module for generating ER fluid.

FIG. 4 shows a module for generating droplets of a second fluid ("control fluid") in a carrier fluid for the first or third channels (the control channels). It may be provided upstream of the arrangement shown in FIG. 1, 2 or 3 and be linked to the first and/or third channels. The module preferably comprises a flow focusing arrangement which has a central channel 101 for conveying control fluid and two side channels 102, 103 for conveying the carrier fluid. Sources of control fluid 101a and carrier fluid 102a, 103a are also shown; these may, for example, be containers and/or pumps. A first droplet generating module may be linked to the first channel and a second droplet generating module may be linked to the third channel. A similar arrangement comprising a source of ER fluid 104 is shown in FIG. 5. The source of ER fluid 104 leads to a channel 120 which links to second channel 20 of FIGS. 1 to 3.

As mentioned above, the carrier fluid may be a type of oil (e.g. silicon oil). The second fluid (the 'control fluid') is preferably a fluid having a higher dielectric constant or conductivity than the dielectric constant or conductivity of the carrier fluid. For example, the second fluid may be a dielectric fluid (e.g. ER fluid, or an organic fluid with a high dielectric constant), water, ionized solution or a conductive fluid. Ionized solution (e.g. NaCl or another ionic compound dissolved in water) was found to work particularly well due to its good conductivity. However, it would be possible to re-arrange the apparatus such that the carrier fluid had a higher dielectric or constant or conductivity than the control droplets, in which case the logical output of the circuit would be reversed.

Figure 6:
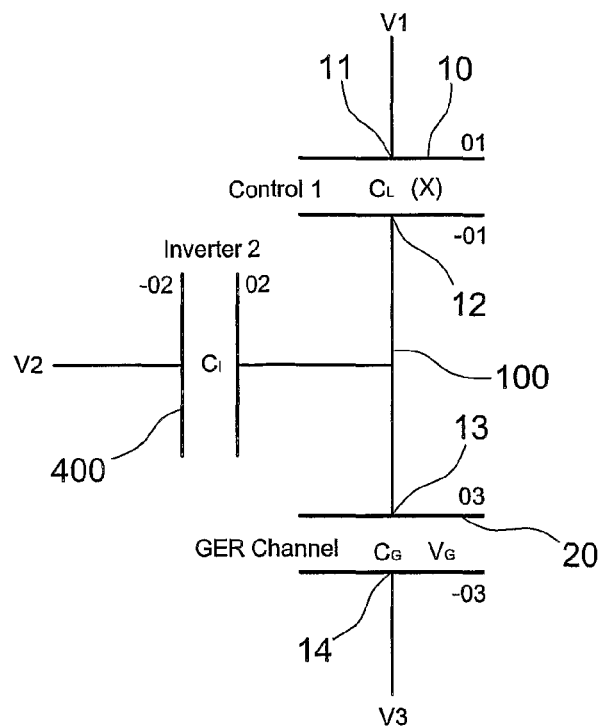
FIG. 6 is a schematic diagram of a microfluidic NOT gate.

FIG. 6 shows an arrangement for a NOT gate. The NOT gate has a first channel 10 for conveying carrier fluid and droplets of a second fluid in the carrier fluid, and having first and second opposing electrodes 11, 12 as in FIG. 1. There is a second channel 20 for conveying ER fluid having third and fourth electrodes 13 and 14 and a first conductor 100 linking the first and second channels via the second and third electrodes. The conductor 100, second 12 and third 13 electrodes may be integral or may be provided as separate parts. The first conductor 100 may be embedded in the microfluidic chip or may be provided as an external conductive line linking electrodes of the microfluidic chip.

In addition a first capacitor 400 is coupled to the first conductor 100. There are first $V_1$, second $V_2$ and third $V_3$ input points for connection to respective voltage sources. Each may be coupled to a voltage source or kept at ground potential. The second input point $V_2$ for connection to a voltage source is coupled to the first conductor 100 via the first capacitor 400. Alternatively the second input point $V_2$ may be coupled directly to the third electrode or indirectly to the third electrode via the second electrode or an external conducting line. In each case the potential from the first capacitor 400 is transmitted to the third electrode 13.

When no droplet is present between the first and second electrodes, the electrical connection between $V_1$ and first conductor 100 physically breaks down. Therefore $V_1$ becomes disconnected from $V_2$ and from first conductor 100. Only the electrical connection between $V_2$ and $V_3$ remains. First capacitor 400 and the second channel 20 (ER channel) then share the applied voltage. As $V_1$ is effectively disconnected, the applied voltage is $V_2$-$V_3$. The total voltage drop across the first capacitor and the second channel is then equal to $V_2$-$V_3$.

$V_2$, $V_3$ and the capacitance of the capacitor 400 are set, or chosen, so that in this situation the voltage across the second channel is equal to or higher than the solidification threshold of ER fluid in the second channel. Thus, when no droplet is present in the first channel 10 (the 'control channel'), ER fluid is solidified in the second channel and flow in the second channel is stopped.

When a droplet is present in the first channel (between the first and the second electrodes), the situation is different. In this case, the voltage signal of $V_1$ is conveyed across the first channel to the second electrode 12 and via conductor 100 to third electrode 13. $V_1$, $V_2$ and $V_3$ are set so that in this situation the voltage drop across the second channel is not sufficient to stop the ER fluid. For example, if $V_1$=-$V_2$ and $V_3$=$V_1$, then $V_1$ cancels $V_3$ at the third electrode 13 when an ionized droplet is presented between electrode 11 and 12, so that the ER fluid in the second channel is free to flow. Otherwise the voltage across the second channel would be $V_3$, which is set high enough to suspend the ER fluid from flowing. $V_1$=-$V_2$ and $V_3$=$V_1$ are just examples, other voltage values could achieve the same result, as will be apparent to a person skilled in the art. The important point is that the potential difference across the second channel is insufficient to solidify the ER fluid when a droplet is between the first and second electrodes 11, 12; but sufficient to stop the ER fluid when no droplet is between the first and second electrodes. The arrangement thus acts as a NOT gate.

The logical input and output of the NOT gate arrangement of FIG. 6 are shown in Table 2 below. It is the direct opposite of the IF gate of FIG. 1.

TABLE 2

| First Channel | Potential difference across Second Channel | ER Rheology | ER State | Flow in Second Channel | Output Signal |
|---|---|---|---|---|---|
| No Droplet | High | Anisotropic Solid | "On" | Off | No Droplet |
| Droplet | Low | Liquid | "Off" | On | Droplet |

Although, in terms of fluid flow, the output in the second channel is the same as the first channel, we define this as a 'NOT' gate because when there is no droplet in the first channel the ER state is activated to "ON", i.e. the ER fluid is solidified.

If the droplet has a lower dielectric constant or conductivity than the carrier fluid then the apparatus will still work, but have the opposite polarity to that described above (e.g. it would act as an IF gate).

Figure 7:
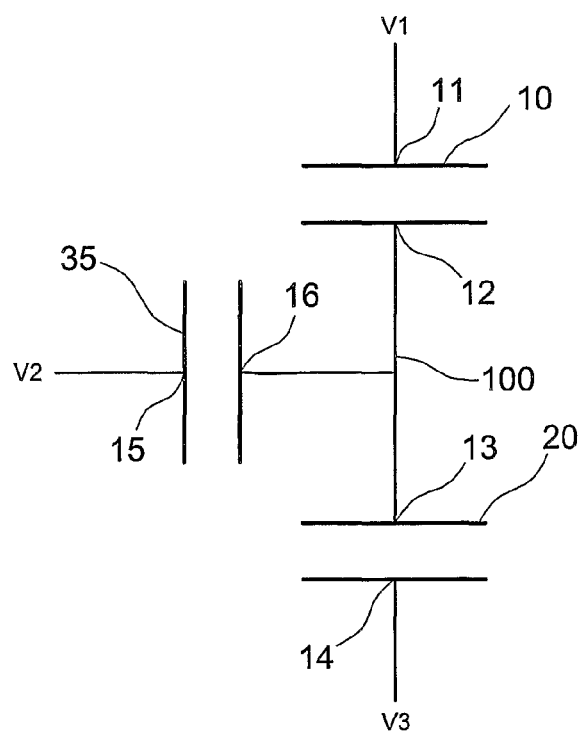
FIG. 7 is a schematic diagram of an alternative arrangement of microfluidic NOT gate.

FIG. 7 shows an alternative arrangement of NOT gate. It is the same as FIG. 6, except that the first capacitor 400 is replaced with a third channel 35. The third channel 35 acts as a capacitor (and may be thought of as a capacitor), so the principle of operation is the same as described above for FIG. 6. Opposing fifth and sixth electrodes 15 and 16 are positioned on either side of the channel 35. When fluid, e.g. ER fluid, flows in the third channel, the channel has a capacitance between the fifth 15 and sixth 16 electrodes. Preferably the channel 35 has the same width and depth as the second channel 20. The same type of ER fluid may flow in the third channel 35 as in the channel 20. The sixth 16 electrode is connected to the third electrode 13 via the first conductor 100 (or alternatively directly to the third electrode or indirectly to the third electrode via the second electrode 12 or an external conducting line). The second voltage input $V_2$ is connected to the fifth electrode 15.

In operation the third channel 35 permits an electrical connection between the second input point $V_2$ and the third electrode 13 of the second channel, but without permitting direct current to flow from the second point $V_2$ to the second channel 20.

The third channel 35 is preferably downstream of a module for providing a fluid to the channel 35. The fluid supplied to the third channel 35 may be ER fluid. The module may comprise a flow focusing arrangement, a source of fluid and/or a pump. The module may be of the same design as shown in FIG. 5.

Figure 8:
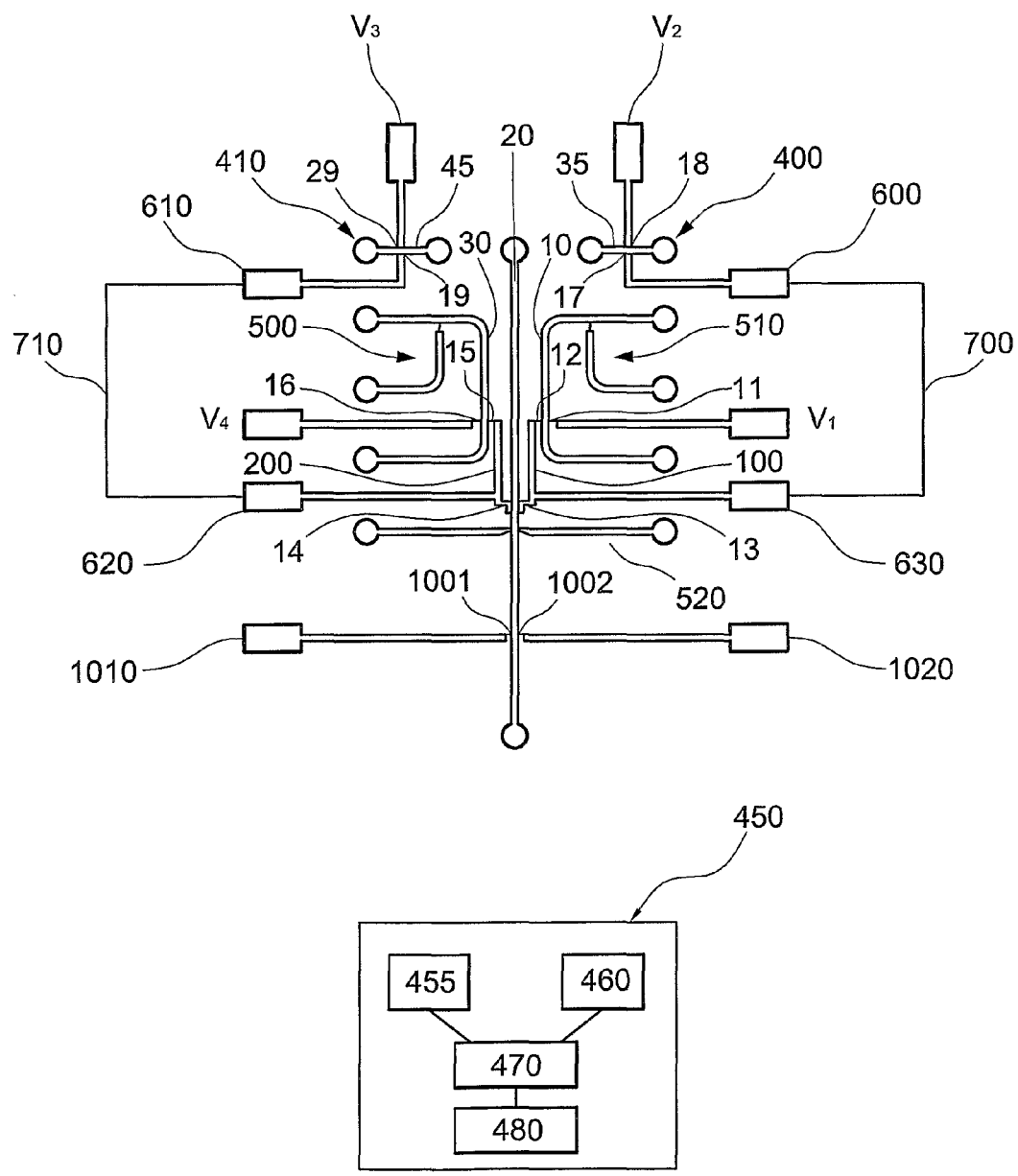
FIG. 8 is a schematic diagram of a universal microfluidic logic gate.
Figure 9A:
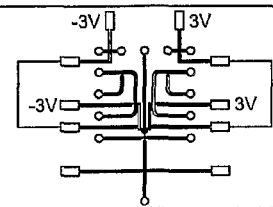
FIGS. 9 (a) to 9 (c) are tables showing how the universal microfluidic logic gate can be configured to perform different logical operations.
Figure 9A:
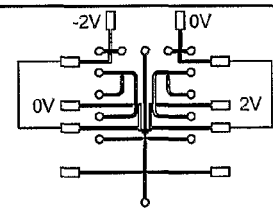
Figure 9A:
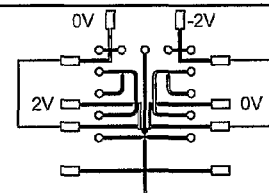
Figure 9A:
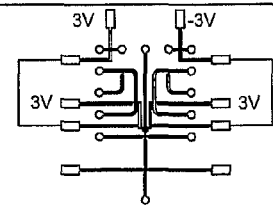
Figure 9A:
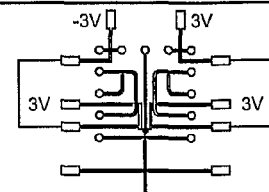
Figure 9B:
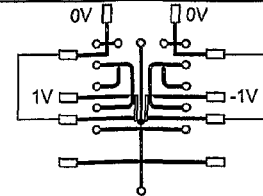
Figure 9B:
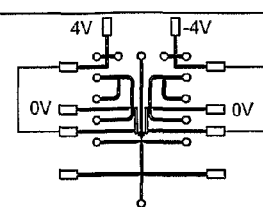
Figure 9B:
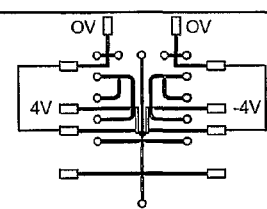
Figure 9B:
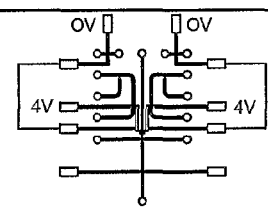
Figure 9B:
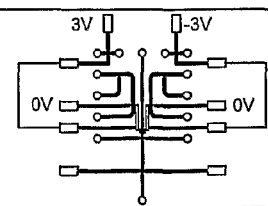
Figure 9B:
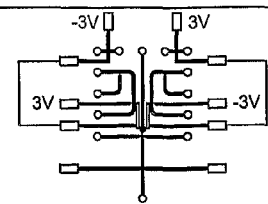
Figure 9C:
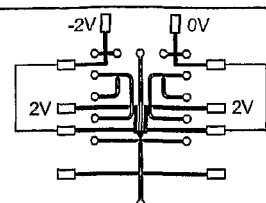
Figure 9C:
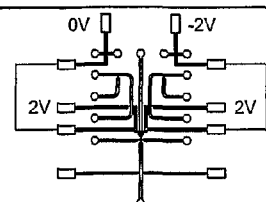
Figure 9C:
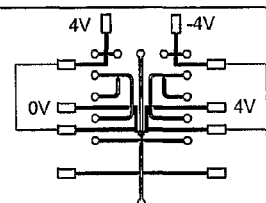
Figure 9C:
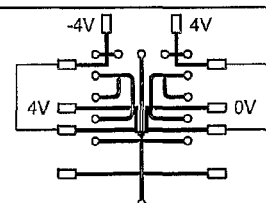

A universal logical gate may be formed by combining several NOT gate structures together. FIG. 8 is a schematic example of such an arrangement. Essentially it is two NOT gate structures coupled to opposing electrodes of the ER fluid channel. There are two control channels and four voltage inputs.

The configuration comprises a first channel 10 for conveying carrier fluid and control droplets in the carrier fluid. The carrier fluid has a first dielectric constant or conductivity and the control droplets have a second dielectric constant or conductivity, which is different to the first dielectric constant or conductivity. Preferably the second dielectric constant or conductivity is higher than the first dielectric constant or conductivity. The carrier fluid may be an oil and the control droplets may be formed of water, ionized solution, ER fluid or any other suitable fluid. The first channel has first 11 and second 12 opposing electrodes. A first voltage input $V_1$ is coupled to the first electrode 11.

There is a second channel 20 for conveying ER fluid. The second channel has third 13 and fourth 14 opposing electrodes. A first conductor 100 electrically connects the second electrode 12 with the third electrode 13. A second voltage input $V_2$ is coupled to the third electrode 13 via a first capacitor 400. The second 12 and third 13 electrodes and first conductor 100 may be provided as one integral piece or as separate elements.

In this embodiment the first capacitor 400 is connected indirectly to the third electrode via the first conductor 100; but in other embodiments it could be connected directly to the third electrode or indirectly to the third electrode (e.g. via the second electrode 12 or an external conducting line). In this embodiment the first capacitor 400 is a fourth channel 35 for conveying fluid. A source of fluid for this channel may be provided by the apparatus. The fourth channel 35 may convey ER fluid and preferably it has the same width as the second channel 20 (as this makes matching the capacitance easier). This arrangement is found to work well and is relatively easy to manufacture. Alternatively a conventional capacitor, e.g. a ceramic capacitor, may be used instead and embedded into the microfluidic chip. The fourth channel 35 has seventh 17 and eighth 18 opposing electrodes facing each other on opposite sides of the channel. The eighth electrode 18 is connected to the second voltage input $V_2$. The seventh electrode is connected to the third electrode 13 directly or indirectly (e.g. via the second electrode 12, the first conductor 100 or an external conducting line).

There is a third channel 30 for conveying carrier fluid and control droplets in the carrier fluid. The carrier fluid has a third dielectric constant or conductivity and the control droplets have a fourth dielectric constant or conductivity. They may be preferably the same as the control droplets and carrier fluid used in the first channel (e.g. the third dielectric constant or conductivity may be equal to the first dielectric constant or conductivity and the fourth dielectric constant or conductivity may be equal to the second dielectric constant or conductivity). The third channel has opposing fifth and sixth electrodes 15, 16. A second conductor 200 electrically connects the fourth and fifth electrodes. The fourth and fifth electrodes and second conductor may be provided as one integral piece or as separate pieces. A fourth voltage input $V_4$ is connected to the sixth electrode 16. A third voltage input $V_3$ is coupled to the fourth electrode via a second capacitor 410. In this embodiment the second capacitor 410 is coupled to the fourth electrode 14 via the second conductor 200; however in other embodiments it may be connected directly to the fourth electrode 14, or indirectly via the fifth electrode or an external conducting line.

In this embodiment the second capacitor 410 is a fifth channel 45 for conveying fluid. A source of fluid for this channel may be provided by the apparatus. The fifth channel 45 may convey ER fluid and preferably it has the same width as the second channel 20 (as this makes matching the capacitance easier). This arrangement is found to work well and is relatively easy to manufacture. Alternatively a conventional capacitor, e.g. a ceramic capacitor, may be used instead and embedded into the microfluidic chip. The fifth channel has ninth 19 and tenth 29 opposing electrodes facing each other on opposite sides of the fifth channel. The tenth electrode 29 is connected to the third voltage input $V_3$. The ninth electrode 19 is connected to the fourth electrode 14 either directly or indirectly (e.g. via the second conductor 200, the fifth electrode 15 or an external conducting line).

A module 510 is provided for generating control droplets and carrier fluid for the first channel 10. In FIG. 8 the module 510 has a T-junction arrangement, but any other suitable arrangement could be used (e.g. a flow focusing arrangement as in FIG. 4). A similar module 520 is provided for generating control droplets and carrier fluid for the third channel 30. There is also a module 520 for providing ER fluid to the second channel. The apparatus may comprise sources of ER fluid, carrier fluid and fluid for forming the control droplets. The first conductor, second and third electrodes may be integrated into one piece 100 or provided as separate elements. The second conductor, fourth and fifth electrodes may be integrated into one piece 200 or provided as separate elements. The first and/or second conductors 100, 200 may be embedded into the microchip or may be provided as external conductive lines (e.g. external wires).

An opposing downstream pair of electrodes 1001 and 1002 are provided by the second channel 20, downstream of the third and fourth electrodes 13, 14. These are for monitoring the flow of ER fluid downstream of the third and fourth electrodes, and provide the ability to utilize the logic operation result from this logic module. Utilization of the logic results from different logic gates will enable further and larger scale integration of the fluidic logic gates to perform complex logic operations.

The voltage input points $V_1$, $V_2$, $V_3$, $V_4$ are preferably relatively broad terminals to which a voltage source or electrical connector may be easily attached. Conductive lines (e.g. wires) link the input points to the electrodes embedded in the microfluid chip channels. These conductive lines may be relatively thin conductive lines embedded in the chip, external lines (e.g. wires external to the chip) or a combination of both. In this embodiment further connectors 610 and 600 are provided and electrically connected to the first and second capacitors 400, 410 respectively. Connector 600 may be coupled to a connector 630 of the first conductor 100 by a wire or other conductive line 700 which is external to the apparatus. In this way the use of long thin wires in the microfluidic chip may be avoided or minimized. Similarly, connector 610 may be coupled to a connector 620 of second conductor 200 by an external conductive link (e.g. a wire) 710.

Flow of ER fluid in the second channel is controlled by the presence or absence of droplets in the first and/or third channels (the 'control channels'). The control is in accordance with a desired logical operation. The logical operation performed by the apparatus is determined by the voltages applied to the first, second, third and fourth voltage inputs. Thus by selecting or adjusting the voltages applied to the voltage inputs any one of 16 different binary logical operations can be performed. In contrast to electric logic gates which requires combinations of XOR and XAND gates to produce other logical combinations, this universal fluid logical gate, is one single 'gate' that can be configured to produce any of 16 desired binary logical results.

Preferably the control droplets in the first and third channels are conductive, e.g. formed of a highly ionized solution. In that case, when there is a control droplet present between the first and second electrodes 11, 12 of the first channel 10, the voltage applied at input $V_1$ is passed through the droplet to the second electrode 12. Likewise, when a control droplet is present between the fifth electrode 15 and sixth electrode 16 of the third channel 30, the voltage at input $V_4$ is passed through the droplet to third electrode 13. If the control droplet is not conductive, but has a high dielectric constant compared to the dielectric constant of the ER fluid, then the arrangement will work in a similar way. If we define the voltage across the second (ER) channel to be $\Delta V$, it can be shown that:—

$$\Delta V = \frac{X_a V_1 + (1 - X_a)V_2 - X_b V_4 - (1 - X_b)V_3}{3 - X_a - X_b}$$

Where $V_1$, $V_2$, $V_3$ and $V_4$ are the voltages applied to the first, second, third and fourth voltage inputs respectively; $X_a=1$ if a droplet is present in the second channel between the first and second electrodes 11, 12 of the first channel and $X_a=0$ if no droplet is present between said electrodes; and $X_b=1$ if a droplet is present between the fifth and sixth electrodes 15, 16 of the third channel and $X_b=0$ if no droplet is present between said electrodes.

We assume the ER fluid in the second channel 20 will be solidified under voltage 2V, where V is a predetermined voltage (e.g. 250 volts, but the value depends on the materials, capacitances, ER fluid type and channel widths used in the apparatus). The voltage drop across the second channel is then as described in Table 3 below, which gives example voltage inputs for producing various logical operations.

TABLE 3

Voltage arrangement for 16 logic operation and output in ER logic gate

| | Assigned Voltage at Voltage Inputs (unit 250 Volts) | | | | | Resulting Voltage Drop across Second Channel (unit 250 Volts) | | | |
|---|---|---|---|---|---|---|---|---|---|
| | | | | | Xa | 0 | 0 | 1 | 1 |
| | $V_1$ | $V_2$ | $V_3$ | $V_4$ | Xb | 0 | 1 | 0 | 1 |
| FALSE | 0 | 0 | 0 | 0 | FALSE | 0 | 0 | 0 | 0 |
| A AND B | 1 | 0 | 0 | −1 | A AND B | 0 | 0.5 | 0.5 | 2 |
| A ≠> B | 2 | 0 | −2 | 2 | A ≠> B | 0.6667 | −1 | 2 | 0 |
| A | 2 | 0 | −2 | 0 | A | 0.6667 | 0 | 2 | 2 |
| A <≠ B | 2 | −2 | 0 | 2 | A <≠ B | −0.667 | −2 | 1 | 0 |
| B | 0 | −2 | 0 | 2 | B | −0.667 | −2 | 0 | −2 |
| XOR | 4 | 0 | 0 | 4 | XOR | 0 | −2 | 2 | 0 |
| A OR B | −4 | 0 | 0 | 4 | A OR B | 0 | −2 | −2 | −8 |
| NOR | 0 | −3 | 3 | 0 | NOR | −2 | −1.5 | −1.5 | 0 |
| A XNOR B | −3 | 3 | −3 | 3 | A XNOR B | 2 | 0 | 0 | −6 |
| NOT B | 3 | 3 | −3 | 3 | NOT B | 2 | 0 | 3 | 0 |
| A <= B | 0 | 4 | −4 | 4 | A <= B | 2.6667 | 0 | 2 | −4 |
| NOT A | 3 | −3 | 3 | 3 | NOT A | −2 | −3 | 0 | 0 |
| A => B | 4 | −4 | 4 | 0 | A => B | −2.667 | −2 | 0 | 4 |
| NAND | 0 | −4 | 4 | 0 | NAND | −2.667 | −2 | −2 | 0 |
| TRUE | 3 | 3 | −3 | −3 | TRUE | 2 | 3 | 3 | 6 |

On the left side of Table 3, the first column gives the type of logical operation and the next four columns give the voltage which should be applied to each of inputs $V_1$ to $V_4$ in order to cause the apparatus to perform that logical operation. The units for the voltage are in multiples of the predetermined voltage V (e.g. V=250 Volts). On the right side, the second part of the table gives the name of the logical operation in the first column, while the top two rows list the four possible combinations of values for $X_a$ and $X_b$ (no droplet between either electrode pair, droplet between electrode pair in first channel but not third channel, droplet between electrode pair in third channel but not first channel, droplets between electrode pairs in both first and third channels). The cells on the right part of the table give the voltage drop $\Delta V$ across the second channel in units of the predetermined voltage V (e.g. V=250 Volts). Thus it can be seen that for the AND operation the voltage applied to input $V_1=V$, $V_2=0$, $V_3=0$ and $V_4=-V$. The voltage drop across the second (ER) channel is then 0 if no droplet is in either channel, 0.5V if a droplet is in only one of the first and third channels and 2V if a droplet is in both first and third channels. Thus only in the latter case is the voltage drop enough to activate the ER fluid and stop flow in the second channel.

We define the output of the logic gate when the ER fluid is solidified as TRUE, which is represented as "1 in binary format. The output when ER fluid is flowing in the second channel is defined as FALSE and represented as "0. The output result for each configuration is shown in Table 4. The left side of table 4 gives the output of the universal fluid logic gate when configured as shown in Table 3, while the right side of the table gives the output in binary format for that type of logic gate according to the standard definition. It can be seen that the universal fluidic logic gate is capable of modeling each type of the 16 logic gates.

TABLE 4

Comparison of ER based universal logic gate and conventional definitions of 16 logic operations

| | Output of ER logic gate | | | | Definition of 16 logic gate | | | |
|---|---|---|---|---|---|---|---|---|
| Xa | 0 | 0 | 1 | 1 | 0 | 0 | 1 | 1 |
| Xb | 0 | 1 | 0 | 1 | 0 | 1 | 0 | 1 |
| FALSE | 0 | 0 | 0 | 0 | 0 | 0 | 0 | 0 |
| A AND B | 0 | 0 | 0 | 1 | 0 | 0 | 0 | 1 |
| A ≠> B | 0 | 0 | 1 | 0 | 0 | 0 | 1 | 0 |
| A | 0 | 0 | 1 | 1 | 0 | 0 | 1 | 1 |
| A <≠ B | 0 | 1 | 0 | 0 | 0 | 1 | 0 | 0 |
| B | 0 | 1 | 0 | 1 | 0 | 1 | 0 | 1 |
| A XOR B | 0 | 1 | 1 | 0 | 0 | 1 | 1 | 0 |
| A OR B | 0 | 1 | 1 | 1 | 0 | 1 | 1 | 1 |
| A NOR B | 1 | 0 | 0 | 0 | 1 | 0 | 0 | 0 |
| A XNOR B | 1 | 0 | 0 | 1 | 1 | 0 | 0 | 1 |
| NOT B | 1 | 0 | 1 | 0 | 1 | 0 | 1 | 0 |
| A <= B | 1 | 0 | 1 | 1 | 1 | 0 | 1 | 1 |
| NOT A | 1 | 1 | 0 | 0 | 1 | 1 | 0 | 0 |
| A => B | 1 | 1 | 0 | 1 | 1 | 1 | 0 | 1 |
| A NAND B | 1 | 1 | 1 | 0 | 1 | 1 | 1 | 0 |
| TRUE | 1 | 1 | 1 | 1 | 1 | 1 | 1 | 1 |

FIGS. 9 (a) to 9 (c) show the universal logic gate arrangement in diagrammatic form for each configuration. The logical operation and $\Delta V$ (in units of the predetermined V) and logical output are listed in each case. A corresponds to $X_a$—the logical state of the first channel, while B corresponds to $X_b$—the logical state of the third channel.

Table 5 below gives a verbal definition of each type of logical operation.

TABLE 5

| INPUT | A | 0 | 0 | 1 | 1 | Meaning of Logical |
| | B | 0 | 1 | 0 | 1 | Operation |
| OUTPUT | FALSE | 0 | 0 | 0 | 0 | Output is false for all input |
| | A AND B | 0 | 0 | 0 | 1 | Output is true if A and B are true |

TABLE 5-continued

| A≠>B | 0 | 0 | 1 | 0 | B is not implied by A: true if A but not B |
| A | 0 | 0 | 1 | 1 | True if A is true |
| A<≠ B | 0 | 1 | 0 | 0 | A is not implied by B. True if B but not A |
| B | 0 | 1 | 0 | 1 | True if B is true |
| A XOR B | 0 | 1 | 1 | 0 | True if A is not equal to B. |
| A OR B | 0 | 1 | 1 | 1 | True if either A or B are true (non-exclusive) |
| A NOR B | 1 | 0 | 0 | 0 | True if neither A nor B |
| A XNOR B | 1 | 0 | 0 | 1 | True if A is equal to B |
| NOT B | 1 | 0 | 1 | 0 | True if B is false |
| A <= B | 1 | 0 | 1 | 1 | B implies A. False if B but not A |
| NOT A | 1 | 1 | 0 | 0 | True if A is false |
| A => B | 1 | 1 | 0 | 1 | A implies B. False if A but not B |
| A NAND B | 1 | 1 | 1 | 0 | False if A and B are both true |
| TRUE | 1 | 1 | 1 | 1 | Output is true for all input |

Thus by adjusting the voltages applied to the voltage inputs $V_1$, $V_2$, $V_3$ and $V_4$ any of the 16 logical operations described above can be achieved. The values for voltage input are just examples and other values or combinations of values will be possible, as will be appreciated by a person skilled in the art. The values needed depend upon, inter alia, the capacitance of the capacitors, the type of control droplets used, the width of the channels and the dielectric constant of the ER fluid and the carrier fluids.

The apparatus may have a control module 450 for controlling the voltages applied to the first to fourth inputs. The control module may have a display 455 and a user interface 460 to enable a user to enter the desired logical operation to be performed by the apparatus. The controller may have a processor 470 which determines the voltage to be applied to each input based on the desired logical operation. It may refer to data in a memory 480. The data may include information relating to the response of the logic gate to different applied voltage; it may include information such as that shown in Table 4 above.

The microchips may be fabricated by any appropriate method. One possible method is described by way of example below.

Figure 10:
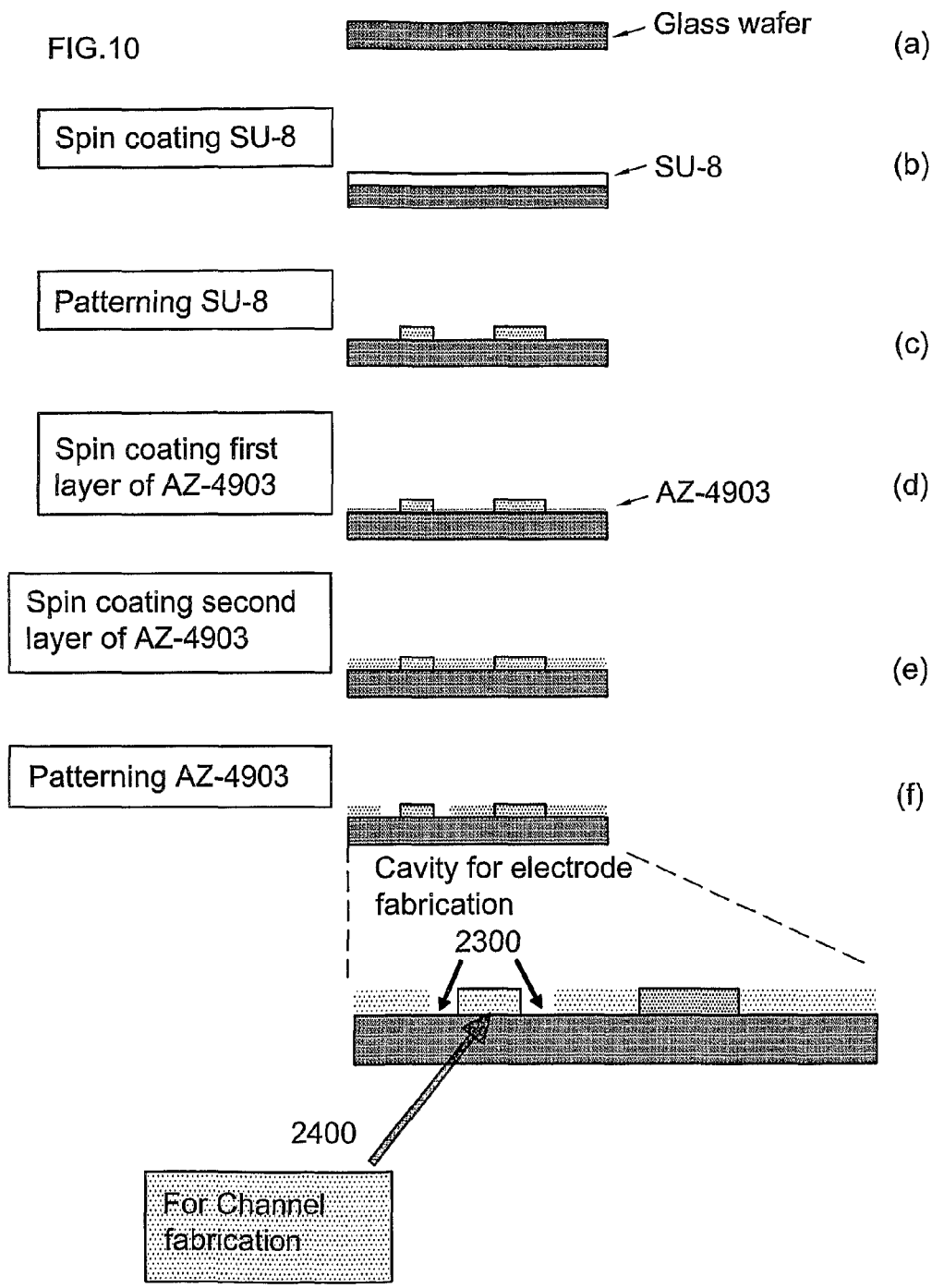
FIGS. 10 (a) to (f) show stages in the manufacturing process of a microfluidic chip.

In brief a mold is first formed by coating photoresists on a wafer and patterning the photoresists by selective exposure to light. A PDMS gel or pre-polymer is then poured into the mold and solidified. The PDMS thus adopts the desired shape with channels and cavities for receiving the conductive material for the electrodes and conducting lines. After solidification the PDMS is removed from the mold and finished by sealing on top with another piece of PDMS to enclose the channels and the electrodes. FIGS. 10 (a) to 8 (f) illustrate steps in manufacturing the mold.

Two kinds of photoresist are employed. The first kind of photoresist is used to fabricate the mold for the fluid channels, while the second kind of photoresist is used to fabricate the mold for the cavities for receiving the electrodes and/or conducting lines. Preferably the photoresists have the same or substantially the same thickness. The second kind of photoresist may be removed by organic solvent, e.g. acetone, while the first type cannot easily be removed by organic solvent. For example, the first photo resist may be SU-8 (negative) and the second photoresist may be AZ-4903 (positive). In a preferred arrangement, SU-8 is used to fabricate the mold for the fluid channels (about 80~90 μm), and AZ-4903 double-coating is used to fabricate the cavities for receiving the conducting lines and/or electrodes (also about 80~90 μm).

Step 1: Clean the Glass Wafer

The glass wafer is cleaned with standard cleaning solution, e.g. $NH_4OH:H_2O_2:H_2O=1:1:5$ (volume ratio). The glass wafer is bathed in this solution for a period of time, e.g. at 70° C. for 15 minutes. The glass wafer is then cleaned with DI (de-ionised) water to remove the cleaning solution and dried with compressed N2 gas. After that, the glass wafer is baked in an oven (e.g. at 120° C. for more than 30 minutes) to get rid of the water on its surface. The wafer is then cooled down to room temperature. The cleaned wafer is shown in FIG. 10 (*a*). A silicon wafer could be used instead of a glass wafer, in which case the method is similar, but exposure energy would be different, as will be understood by a person skilled in the art.

Step 2: Photolithography of SU-8 Pattern

Photoresist SU-8 is spin-coated onto the wafer at a suitable spin rate (e.g. for SU-8 2025 one suitable spin rate is 500 rpm for 10 s and then 1000 rpm for 30 s; for SU-8 2050 a suitable spin rate would be 500 rpm for 10 s and then 1700 rpm for 30 s). Alternatively, a different positive photoresist could be used to achieve the same thickness. The sides of wafer are cleaned carefully and the whole wafer is placed on a level clean surface for a sufficient time to make the surface of the photoresist substantially flat. Then the wafer is then soft baked on a hotplate: e.g. at 65° C. for 5 minutes and then 95° C. for 15 minutes and 65° C. for 2 minutes. The wafer is then placed on a level clean surface for a period of time, preferably at least 10 minutes. The wafer after it has been spin coated with SU-8 is shown in FIG. 10 (*b*).

After that, the wafer is exposed with exposure energy about 600 mJ/cm2. During the exposure, a mask with the desired pattern is placed close to the baked photoresist. After exposure, the wafer should be placed on a levelled clean surface for at least 10 minutes to complete the reaction in the photoresist layer. Later, the wafer is hard baked on hotplate, e.g. at 65° C. for 5 minutes, 95° C. for 10 minutes and 65° C. for 2 minutes to evaporate solvent, and then placed on a level clean surface for at least 10 minutes. The last step is to develop the wafer in SU-8 developer for around 10 minutes and make sure that all of the unexposed SU-8 is removed. The wafer can be checked and then cleaned with IPA, and dried with compressed N2 gas. The wafer after the SU-8 patterning is complete is shown in FIG. 10 (*c*).

Step 3: Photolithography of AZ-4903 Pattern

The photoresist AZ-4903 is pre-coated by hand to evenly distribute AZ-4903 photoresist on the wafer, especially the part of the wafer with the SU-8 pattern. It is then placed on a spin-coater machine and spun, e.g. at a rate of 500 rpm for 5 s and then 800 rpm for 30 s. The sides of the wafer are cleaned carefully and the wafer is then left on a level clean surface for a period of time, e.g. 3 minutes. Then the wafer is then baked on a hotplate: e.g. at 50° C. for 5 minutes and 110° C. for 3 minutes. After baking, the wafer is left on a level clean surface to cool down to room temperature. The assembly after spin coating of the first layer of AZ-4903 is shown in FIG. 10 (*d*).

Next, the spin coating process is repeated for a second layer of AZ-4903. This time it is baked on a hotplate, e.g. at 50° C. for 5 minutes and 110° C. for 8 minutes. After baking, the wafer is left on a level clean surface to cool down to room temperature. Then, the part of the wafer with marks may be cleaned (e.g. a part with small structures of SU-8 pattern at the side of the wafer). The cleaning may involve removing the AZ-4903 from these parts by use of acetone, so that they can be seen clearly during alignment. The assembly after spin coating of the second layer of AZ-4903 is shown in FIG. 10 (*e*).

A mask is put on the surface of the wafer and aligned under a microscope. Once aligned, the wafer is exposed to UV with exposure energy about 2000 mJ/cm2. After exposure, the wafer is placed on a levelled clean surface for at least 10 minutes to complete the reaction in the photoresist layer.

The wafer is developed by a solution which comprises AZ400K:H2O=1:3 (volume ratio) for several minutes until all the exposed parts are removed. Then, the wafer is cleaned by DI water and dried with compressed N2 gas. The assembly after patterning of the AZ-4903 is shown if FIG. 10 (*f*). It has two cavities 2300 for the electrode fabrication and a part for channel fabrication 2400.

Step 4: Surface Treatment

The fourth step is to carry out surface treatment to avoid the electrode and/or conductive line material (e.g. Ag-PDMS) from sticking to the surface of the wafer. This may be done by evaporating silane on the surface of the fabricated wafer under vacuum conditions.

Step 5: Electrode Fabrication

PDMS gel is fabricated, e.g. by mixing the base and curing agent at a ratio of 10:1 (by weight). Then electrode material (e.g. Ag micro particles, preferably of 1-2 μm size) is mixed with the PDMS gel, e.g. at a ratio of 6.8:1 (by weight). The mixture is then filled into the cavities 2300 on the wafer pattern. Any redundant parts are removed by scrubbing face-down first with a flat smooth scrubber (such as typing paper) and then with a smoother scrubber (such as weighing paper).

After baking in an oven, e.g. at 60° C. for 30 minutes, the assembly is bathed in acetone about 1 minute to removed the photoresist AZ4903. The acetone is then removed by bathing in ethanol, and finally the ethanol is removed by DI water. The assembly is then baked in an oven, e.g. at 60° C. for 10 minutes.

Step 6: Channel Fabrication

PDMS gel of approximately 2 mm (the same fabrication method as described above) is poured on the surface of the wafer. The assembly is then baked in an oven at 60° C. for 2 hours or so. Then the cured PDMS slab is taken off from the wafer carefully and holes are drilled at the outlet parts PDMS gel of approximately 1 mm is poured on a flat surface and then baked, e.g. at 60° C. for around 20 minutes, until it is almost solidified but still is a little bit sticky. Then, the PDMS slab, which has been fabricated, is placed on the surface of an almost-solidified PDMS layer (which forms a roof or top part for sealing the channels). After baking in an oven at 60° C. for 30 minutes, the whole assembly is put on hotplate at 150° C. for 2 hours to make sure the electrode material (e.g. AgPDMS) is conductive. The fabrication process of the chip is then competed.

The present invention may be embodied in other specific forms without departing from its spirit or essential characteristics. The described embodiments are to be considered in all respects as illustrative and not restrictive. The scope of the invention is, therefore, to be indicated by the appended claims. All changes which come within the meaning and range of equivalency of the claims are to be embraced within their scope.

The invention claimed is:

1. Apparatus for controlling flow of electrorheological (ER) fluid comprising:
   a first channel for conveying carrier fluid of a first dielectric constant or conductivity and droplets of a second dielectric constant or conductivity in the carrier fluid;
   a second channel for conveying ER fluid;
   wherein the first channel has a first and second opposing electrodes and the second channel has third and fourth opposing electrodes;
   a first conductor electrically connects the second electrode with the third electrode;
   a first voltage input V1 connected to the first electrode; and
   a second voltage input V2 connected to the third electrode via a third channel, wherein the third channel comprises a fifth electrode connected to said second voltage input V2 and a sixth electrode connected to the third electrode and the third channel is arranged for conveying a dielectric fluid.

2. The apparatus of claim 1 wherein the first and second voltage inputs are set such that, in use, the ER fluid is stopped in the second channel when no droplet is present between the first and second electrodes of the first channel.

3. The apparatus of claim 1 comprising a module for generating said droplets.

4. The apparatus of claim 1 comprising a voltage source for applying a voltage to said first voltage input.

5. The apparatus of claim 1 comprising a voltage source for applying a voltage to said second voltage input.

6. The apparatus of claim 1 further comprising:
   a source of ER fluid;
   a source of carrier fluid; and
   a source of droplets of a second fluid, wherein the second fluid has a different dielectric constant or conductivity than the carrier fluid.

7. The apparatus of claim 6 wherein the second fluid comprises water or is an ionized fluid.

8. A device, comprising:
   a first channel, a second channel, and a third channel for conveyance of fluids, wherein the first channel is adapted to convey a carrier fluid of a first dielectric constant or conductivity and a droplet of a second dielectric constant or conductivity via the carrier fluid;
   a first electrode proximate to a first portion of the first channel and arranged opposite a second electrode proximate to a second portion of the first channel;
   a third electrode proximate to a first portion of the second channel and arranged opposite a fourth electrode proximate to a second portion of the second channel, wherein an electrical connection is formed by a conductor between the second electrode and the third electrode; and
   a fifth electrode proximate to a first portion of the third channel and arranged opposite a sixth electrode proximate to a second portion of the third channel, wherein the sixth electrode is electrically connected to the second electrode and third electrode, and wherein a change in a first voltage between the first and second electrodes affects a second voltage between the third and fourth electrodes relative to a third voltage between the fifth and sixth electrodes.

9. The fluidic logic device of claim 8, wherein the second channel conveys an electrorheological (ER) fluid and the flow of the ER fluid is controllable by the second voltage based at least in part on the first voltage and the third voltage.

10. The fluidic logic device of claim 8, wherein the first channel conveys a carrier fluid and a bubble of a control fluid, and wherein the first voltage changes based on the presence of the carrier fluid or the bubble of the control fluid between the first and second electrodes.

11. The fluidic logic device of claim 10, wherein the carrier fluid and the bubble of the control fluid are immiscible.

12. The fluidic logic device of claim 10, wherein the carrier fluid and the bubble of the control fluid have different dielectric values.

13. The fluidic logic device of claim 10, wherein the carrier fluid and the bubble of the control fluid have different conductivities.

14. The fluidic logic device of claim 10, wherein the bubble of the control fluid comprises a suspended conductive particle.

15. The fluidic logic device of claim 10, wherein the third channel conveys an ER fluid.

16. The fluidic logic device of claim 8, wherein a capacitance of the second channel, having an ER fluid between the third and fourth electrodes, and another capacitance of the third channel, having a fluid between the fifth and sixth electrodes, are a same or similar capacitance.

17. The fluidic logic device of claim 8, wherein a capacitance of the second channel, having an ER fluid between the third and fourth electrodes, and another capacitance of the third channel, having a fluid between the fifth and sixth electrodes, are different capacitances.

18. A fluidic NOT logic device, comprising:
   a control channel for conveying a carrier fluid and a bubble of a control fluid;
   a switchable channel for conveying an electrorheological (ER) fluid;
   an inverter channel for conveying a dielectric fluid;
   a first electrode proximate to a first portion of the control channel and arranged opposite a second electrode proximate to a second portion of the control channel;
   a third electrode proximate to a first portion of the switchable channel and arranged opposite a fourth electrode proximate to a second portion of the switchable channel, wherein an electrical connection is formed by a conductor between the second electrode and the third electrode; and
   a fifth electrode proximate to a first portion of the inverter channel and arranged opposite a sixth electrode proximate to a second portion of the inverter channel,
   wherein an inverter voltage, between the fifth and sixth electrodes of the inverter channel conveying the dielectric fluid, effects a switching voltage, between the third and fourth electrodes of the switchable channel conveying the ER fluid,
   wherein a viscosity of the ER fluid increases when a first control voltage, between the first and second electrodes of the control channel conveying the carrier fluid and the bubble of the control fluid, results from the carrier fluid being present between first and second electrodes, and
   wherein the viscosity of the ER fluid decreases when a second control voltage, between the first and second electrodes of the control channel conveying the carrier fluid and the bubble of the control fluid, results from the bubble of the control fluid being between the first and second electrodes.

19. The fluidic NOT logic device of claim 18, wherein the carrier fluid and the bubble of the control fluid are immiscible, and have different dielectric values or different conductivity values.

20. The fluidic NOT logic device of claim 18, wherein the bubble of the control fluid comprises a suspended conductive material.

* * * * *